United States Patent
Yamazaki et al.

[11] Patent Number: 5,154,654
[45] Date of Patent: Oct. 13, 1992

[54] EXHAUST SYSTEM FOR OUTBOARD MOTOR

[75] Inventors: Susumu Yamazaki; Eiichiro Tsujii; Manabu Nakayama, all of Hamamatsu, Japan

[73] Assignee: Sanshin Koygo Kabushiki Kaisha, Hamamatsu, Japan

[21] Appl. No.: 661,430

[22] Filed: Feb. 25, 1991

[30] Foreign Application Priority Data

Feb. 26, 1990 [JP] Japan .................. 2-42563

[51] Int. Cl.⁵ .................. B63H 21/32; B63H 21/34; B63H 21/38
[52] U.S. Cl. .................. 440/89; 440/88
[58] Field of Search .................. 440/89, 83, 88, 76, 440/78, 86, 87; 115/41, 73

[56] References Cited

U.S. PATENT DOCUMENTS

| | | | |
|---|---|---|---|
| 2,755,766 | 7/1956 | Wanzer | 440/89 |
| 2,847,968 | 8/1958 | Wanzer | 440/89 |
| 3,929,089 | 12/1975 | Lambrecht et al. | 115/41 |
| 4,178,873 | 12/1979 | Bankstahl | 115/73 |
| 4,293,304 | 10/1981 | Sandstrom et al. | 440/83 |
| 4,326,374 | 4/1982 | Streb | 440/89 |
| 4,787,869 | 11/1988 | Shiozawa | 440/89 |
| 4,881,370 | 11/1989 | Sakurai et al. | 440/89 |
| 4,955,838 | 9/1990 | Wenstadt | 440/89 |

FOREIGN PATENT DOCUMENTS 2082994A 3/1982 United Kingdom.

Primary Examiner—Joseph F. Peters, Jr.
Assistant Examiner—Kenneth Lee
Attorney, Agent, or Firm—Ernest A. Beutler

[57] ABSTRACT

An outboard motor for mounting on the transom of a boat, having a horizontal engine and output shaft, an exhaust system having horizontal and vertical portions including an enlarged cross sectional water jacketed muffler within a water chamber having a retaining wall defining the water level, is tiltable and provides an enclosure for the engine area including a cowling, hood, and moveable hood section and a sleeve between the moveable hood and engine to perfect enclosure during tilting.

15 Claims, 5 Drawing Sheets

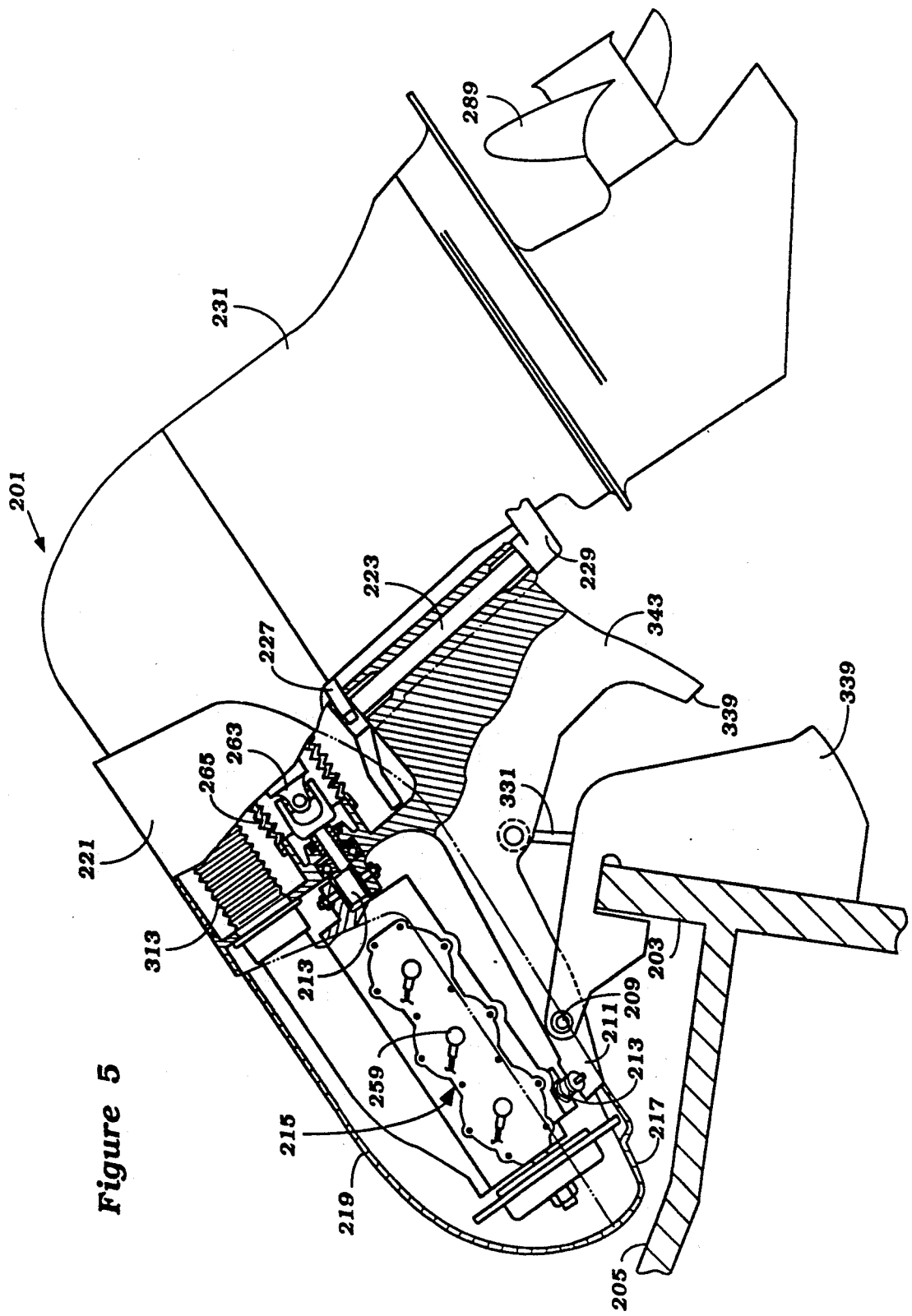

EXHAUST SYSTEM FOR OUTBOARD MOTOR

BACKGROUND OF THE INVENTION

This invention relates to an outboard motor, and more particularly, to an improved outboard motor having a compact configuration with an improved exhaust having improved silencing characteristics.

Conventional outboard motors generally are affixed so that they extend just rearwardly of the transom of a watercraft and include a driveshaft housing in which a vertically positioned driveshaft is journaled for driving a propulsion unit in the lower unit to propel the watercraft. An internal combustion engine is normally mounted in a power head above the driveshaft housing and has its output shaft directly coupled to the driveshaft for driving the propulsion unit. Consequently, the exhaust system is typically shortened, rigid, and movable with the engine and lower drive unit. Although this type of construction has advantages, it tends to severely restrict the overall length and configuration of the exhaust system. Such restricted length and configuration inhibits the tunability of the exhaust path and degrade engine performance both in terms of engine efficiency and the excess noise produced by the engine. In addition, a shorter exhaust path reduces the opportunity for adequate exhaust gas cooling before the exhaust gases are expelled.

SUMMARY OF THE INVENTION

This invention is adapted to be embodied in an outboard motor for attachment as a unit to the transom of a watercraft. An internal combustion engine has a horizontally disposed engine output shaft. A driveshaft housing journals a driveshaft for rotation about a generally vertically extending axis and drives propulsion means at the lower end of the driveshaft housing for propelling a watercraft. An extended, water jacketed, exhaust system extends from the exhaust ports along the upper side of the engine to the drive unit, and includes a water jacketed muffler having an expanding cone at its entrance and a shrinking cone nearer its exit. An expansion chamber receives the cooled silenced exhaust gases from the muffler exit before the exhaust gases are expelled in the below water level propeller hub. The extended exhaust system also includes a flexible exhaust bellows and a flexible water bellows surrounding the flexible exhaust bellows, both of which are flexible at the steering axis and the tilting pivot axis of a first embodiment, and are flexible at the steering axis of a second embodiment. The exhaust system further includes a protection sleeve to mitigate the possibility of wear to the water jacketed exhaust conduit.

DETAILED DESCRIPTION OF THE PREFERRED EMBODIMENT

Figure 1:
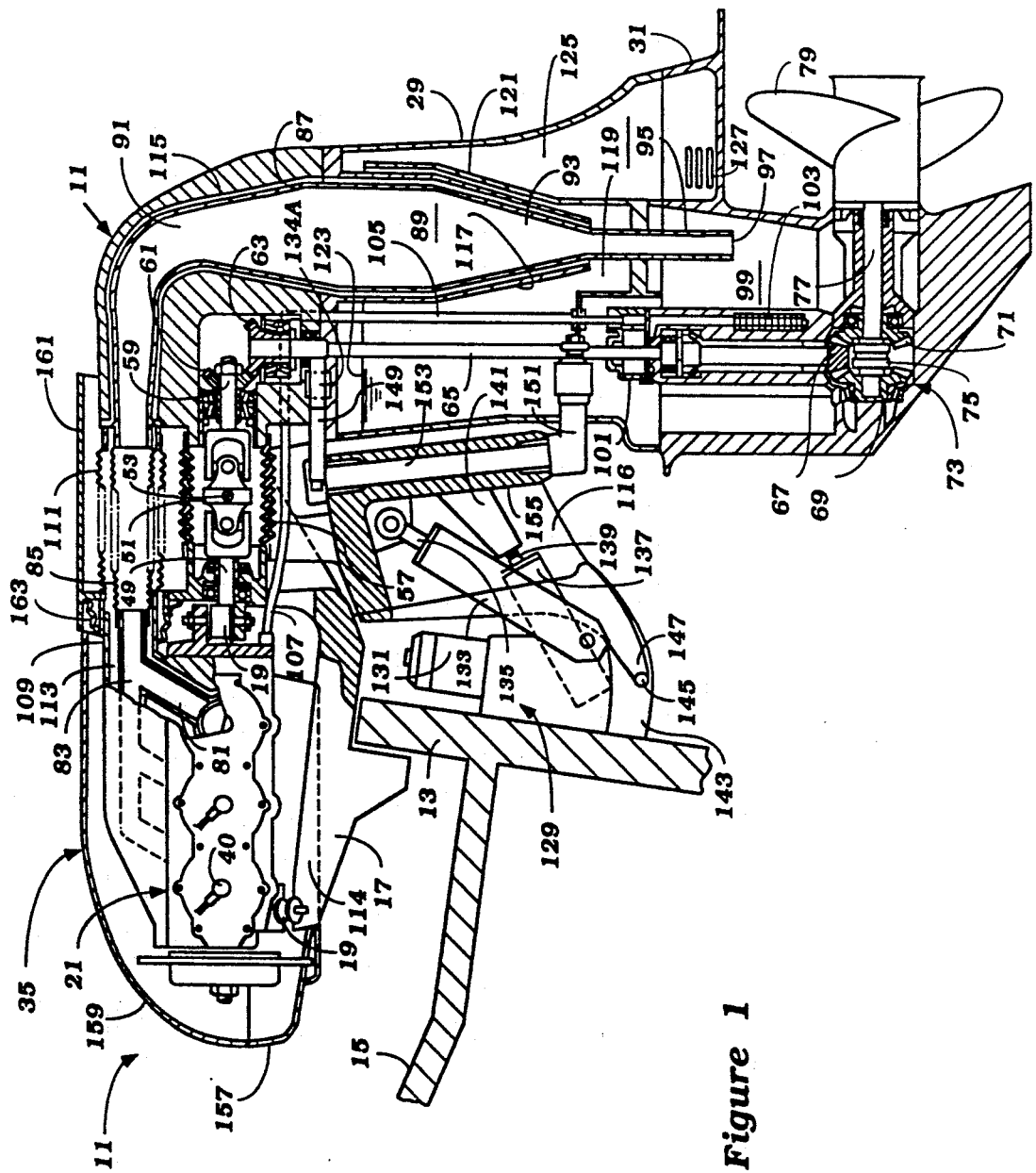
FIG. 1 is a side cross sectional view of the outboard motor of the present invention in its normal running position.
Figure 2:
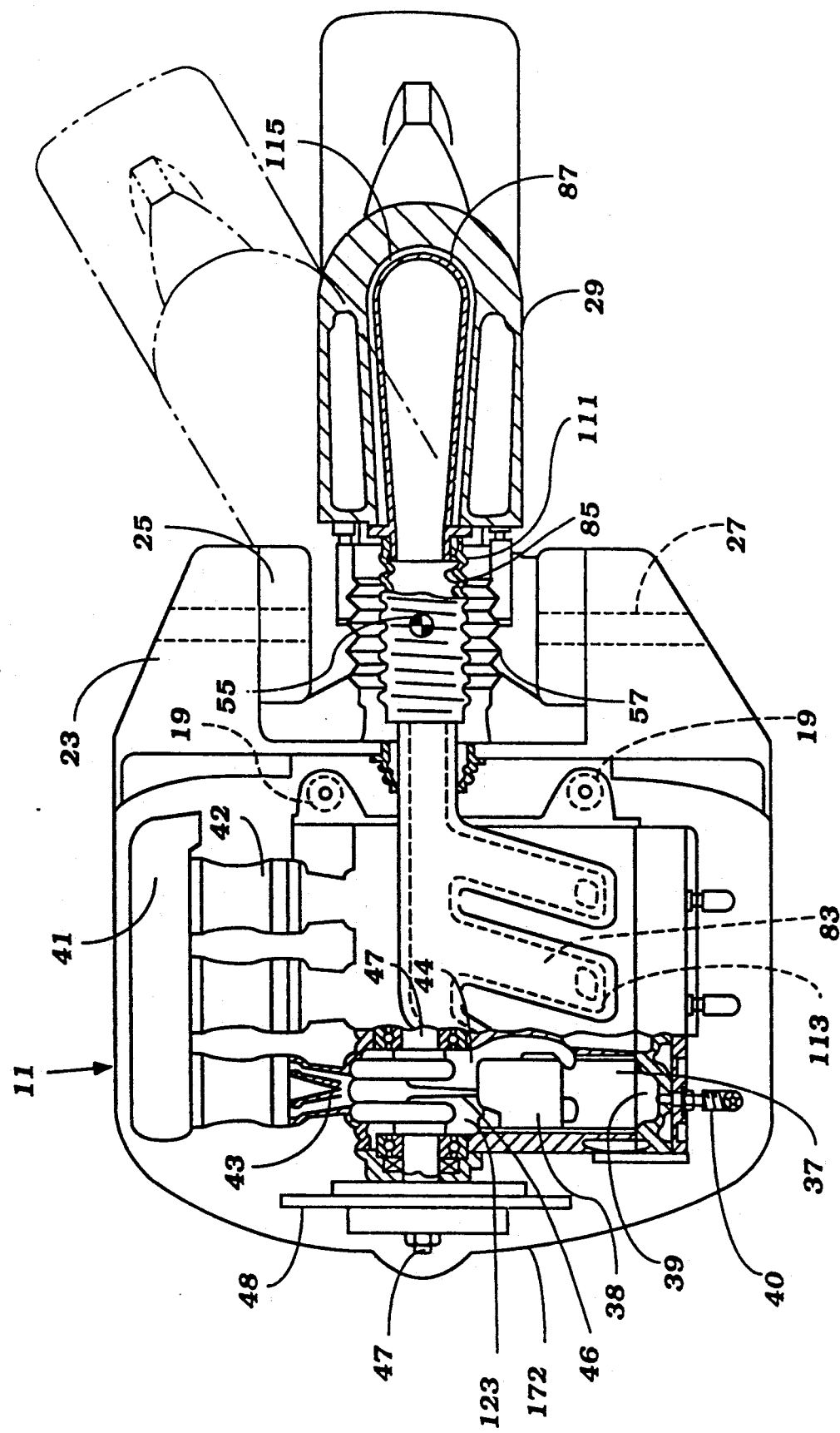
FIG. 2 is a top sectional view of the outboard motor illustrated in FIG. 1, emphasizing the exhaust transmission system.

Referring to FIGS. 1 and 2, the internal details and configuration of an outboard motor 11 of the present invention will be explained in great detail. The systems of outboard motor 11 cooperate in a synergistic manner to produce an outboard engine having an extended exhaust system having increased efficiency and silencing in addition to other features including a low profile, low center of gravity, an aftwardly oriented center of gravity, and a reduced space requirement. In FIGS. 1 and 2, the outboard motor 11 of the present invention is illustrated in operating position, attached to the transom 13 of a boat. Adjacent transom 13 is a motor well 15. The transom 13 and motor well 15 generally define the space available in a typical boat to accommodate a typical outboard motor.

The systems of outboard motor 11 of the present invention which cooperate to provide a superior outboard motor include the structural support and steering system, the mechanical power transmission system, the cooling system, the exhaust system, and the tilt system. Each of these systems will be explored in order to familiarize the reader with the manner in which they are cooperatively engaged by the outboard motor 11 of the present invention.

With regard to structural support, outboard motor 11 is adapted to be attached to transom 13 of a boat (not shown). The transom 13 and the motor well 15 not only provide the space within which the outboard motor of the present invention must limit its movement, but must provide support to outboard motor 11. Motor well 15 usually includes side boundaries, as are well known, but they are not illustrated in the figures.

Transom 13 supports a clamp bracket 17. Clamp bracket 17 supports engine mounts 19, both of which provide cushioned support to a horizontally oriented engine 21. Referring to FIG. 2, clamp bracket 17 also supports an outer tilt bracket 23. An inner tilt bracket 25 is attached to outer tilt bracket 23 by means of a pair of pivot pins 27. Inner tilt bracket 25 angularly moves with respect to outer tilt bracket 23 about the pivot pins 27. The inner tilt bracket 25 is further connected to a driveshaft housing 29, and is in turn connected to a lower unit 31, as is shown in FIG. 1. Both the driveshaft housing 29 and the lower unit 31 are typically made of cast aluminum.

In the power transmission system, the engine 21 occupies a space generally referred to as the power head, which is generally indicated by the numeral 35. Referring to FIG. 2, the engine 21 contains a number of cylinders 37, each one of which is occupied by a piston 38. Piston 38 opposes a spark plug 39. Spark plug 39 is electrically connected to a spark plug wire 40.

A silencer 41 feeds air into a series of carburetors 42, which are in communication, through intake manifold 43, with crankcase 44. Scavenge ports 45 provide the fuel and air mixture to the cylinders 37, and combustion occurs in a well-known manner. Piston 38 is connected to a piston rod 46, which is in turn connected to a crank shaft 47. External with respect to engine 21, the crank shaft engages a flywheel 48. At its other end, crank shaft 47 is connected to a drive shaft 49, shown in FIG. 1.

Driveshaft 49 is connected to a universal joint 51. In FIG. 1, center of universal joint 51 is marked showing the circular tilt axis 53. In FIG. 2, the circular swivel axis marker 55 is shown. In each case, the markers 53 and 55 each represent an axis about which tilting and swivelling, respectively, may occur. The universal joint 51 is surrounded by a transmission bellows 57 to protect and isolate the universal joint 51.

Universal joint 51 is in turn connected to a power transmission shaft 59. At the end of power transmission shaft 59 is a bevel gear 61. Bevel gear 61, which turns in the horizontal axis, makes beveled contact with a bevel gear 63, which turns in the vertical axis. Bevel gear 63 is connected to one end of driveshaft 65 which extends through and is suitably journaled in driveshaft housing 29. Driveshaft 65 extends into the lower unit 31 where it is connected to a gear 67. Gear 67 engages counter-rotating gears 69 and 71 within a gear box 73. A clutch 75 is splined to a propeller shaft 77 and couples that shaft to either the gear 69 or 71 for selected forward or reverse drive. A propeller 79 is suitably fixed to propeller shaft 77 and is of a suitable type to make driving engagement with the water, such type dependent upon the load and running conditions of a boat.

Propeller 79 is typically of the type permitting discharge of exhaust gasses through its hub, also known as a high speed gas discharge. This gas discharge is normally disposed below the surface of the water, as is propeller 79. Note also the relative aft displacement of the driveshaft 65 and the driveshaft housing 29, which causes a more aftwardly located center of gravity.

The extended exhaust system is best illustrated with reference to FIG. 1. An exhaust port 81 is shown extending upwardly and aftwardly of engine 21 joining into an exhaust manifold 83. As is shown in FIG. 2, the exhaust port 81 extends upwardly and over the side of engine 21 and the exhaust manifold 83 extends over the top side of engine 2!.

The exhaust manifold 83, which forms the first length of the horizontal portion of the exhaust system, joins an exhaust bellows 85. Exhaust bellows 85 has a series of corrugations along its main body portion, and is typically made of a flexible material. The material of exhaust bellows 85 must have the ability to flexibly cycle a large number of times because each time the driveshaft housing 29 and lower unit 31 is steered, the exhaust bellows 85 will be flexed about the generally vertical steering axis. Each time the driveshaft housing 29 and lower unit 31 is tilted, the exhaust bellows 85 will be flexed about the horizontal tilt axis. Exhaust bellows 85 is positioned at the lateral center of outboard motor 11, and along its center line, and crosses both the steering and tilt axes. In this manner, the exhaust bellows 85 will flex evenly for both steering and tilting movement of the driveshaft housing 29 and lower unit 31, rather than stretch and compress, as the case would be if it were mounted off center. This is important to extend the life of exhaust bellows 85, because a flexing motion about its center line produces less deformation than would stretching and compression.

The other end of exhaust bellows 85 is connected to an exhaust muffler 87. Exhaust muffler 87 forms the last part of the horizontal portion of the exhaust system, makes a right angle in the downward direction and then forms the first part of the vertical portion of the exhaust system. A right angle in the exhaust path improves silencing. Exhaust muffler 87 then opens into a vertically oriented expansion chamber 89. Exhaust muffler 87 may be made of steel plating, as may be necessary to withstand the harsh exhaust environment.

Note the shape of the expansion chamber 89 of the exhaust muffler 87. Expansion chamber 89 is formed by an expanding cone section 91 and a shrinking cone section 93 along its vertical length from the first part of the vertical portion nearest its entrance, to a point near an exit pipe 95. These expanding and shrinking cone sections 91 and 93 are sections of increasing and decreasing cross sectional area along the length of muffler 87 from a point nearer its entrance to a point nearer its exit. The changing cross sectional area provides for exhaust noise attenuation over a wider range of noise frequency than would be the case for a constant cross section muffler. Expansion chamber 89 also provides tuning to eliminate frequency dependent back pressure from denigrating the performance of engine 21.

Exit pipe 95 terminates at an end 97, within an exhaust chamber 99 which is in communication, through a path not shown, with the center portion of propeller 79. In this manner the exhaust gases are expelled through propeller 79, typically beneath the water line in order to improve silencing. The extended distance between exhaust port 81 and the point where the exhaust gases are expelled through propeller 79 is made possible in part by locating the engine 21 forward of the transom 13 while extending the driveshaft housing 29 and lower unit 31 farther aft of the transom 13.

To provide insulatory cooling water for the engine 21 and exhaust system of the outboard motor of the present invention and to improve the silencing characteristics of the outboard motor 11 of the present invention, a water jacketing system is provided. In FIG. 1, a water pump 101 is connected to a water inlet 103. The outlet of water pump 101 is in communication with a cooling water passage 105 which extends into a cooling water hose 107. Cooling water hose 107 is in communication with a water jacket 109, which extends from points over the engine 21 surrounding exhaust ports 81 and exhaust manifold 83 to a water bellows 111. Water jacket 109 forms an annular flow path 113 between the exterior of water jacket 109 and the exterior of the exhaust ports 81 and exhaust manifold 83.

Water bellows 111 is similar in general geometry to exhaust bellows 85 in that they have sealing ends and a corrugated center section. Water bellows 111 lies concentrically about exhaust bellows 85 and provides an annular flow path about the exhaust bellows 85. This concentric flow path is a continuation of the concentric flow path 113. In addition, water bellows 111 is also typically made of a flexible material. The material of water bellows 111 must also have the ability to flexibly cycle a large number of times because each time the driveshaft housing 29 and lower unit 31 is steered, the water bellows 111 will be flexed.

Water bellows 111 is also positioned at the lateral center of outboard motor 11, and along its center line. In this manner, the water bellows 111 will also flex evenly for steering movement of the driveshaft housing 29, rather than stretch and compress, as the case would be if it were mounted off center. Even more importantly, water bellows 111 must bend and flex evenly to keep an even annular separation from exhaust bellows 85. An even annular space insures that adequate cooling water will surround exhaust bellows 85, and keep its temperature uniformly relatively low. Even annular spacing prevents a portion of the radial extension of exhaust bellows 85 from being starved of cooling water, to prevent formation of a localized hot spot which could unduly thermally cycle or damage the exhaust bellows 85, as well as the concentrically adjacent spot on the water bellows 111.

The annular flow path within water bellows 111 is in open communication with a water passage 115 in the upper portion of the driveshaft housing 19. Water passage 115 extends downwardly along the length of muffler 87 to a point where the exit pipe 95 begins. Water passage 115 is bound by the driveshaft housing 29 for a little less than half the distance of its extension downwardly and along muffler 87. For the remainder of its extension downwardly and along muffler 87 it is bound by an annular cone section 117. Annular cone section 117 extends coextensive with water passage 115 until the water passage 115 opens into a water chamber 119. Water chamber 119 extends around muffler 87, including a portion of the exit pipe 95 and the annular cone section 117. Water chamber 119 extends forward of annular cone section 117, bound by the surface of the driveshaft housing 29, and forming a substantial volume within driveshaft housing 29. Water chamber 119 extends aftward of annular cone section 117 for a very short distance, and is bound by a retaining wall 121. The separation between retaining wall 121 and the exterior of the annular cone section 117 is about the same as the separation between muffler 87 and annular cone section 117.

As is illustrated in FIG. 1, there is a water level present in water chamber 119, as indicated by the numeral 123. Water level 123 coincides with the uppermost edge of retaining wall 121, the uppermost edge of retaining wall 121 forming a spillway over which cooling water runs. The cooling water runs into a rear chamber 125 where it exits through a number of horizontal slots 127.

The volume of water held within water chamber 119 lends additional weight to the driveshaft housing 29, and thus contributes additional weight to the rear of the outboard motor 11 and to the operating efficiency of the outboard motor 11 by lessening the degree of trim necessary for proper operation of the boat to which outboard motor 11 is attached.

The tilt system for the outboard motor 11 is adjacent transom 13. A power tilt device is generally designated as 129. Power tilt device 129 has an oil pump (not shown) adjacent an electric motor 131 situated atop power tilt device 129. Adjacent electric motor 131 and connected to clamp bracket 17 at a point near the housing of power tilt device 129, is a tilt cylinder 133 having a tilt cylinder rod 135 attached to the upper inside portion of the driveshaft housing 29. Laterally adjacent the lower portion of tilt cylinder 133 is a trim cylinder 137 attached to power tilt device 129. Trim cylinder 137 has a trim cylinder rod 139 which makes contact with an arm 141. Arm 141 is attached to driveshaft housing 29.

Note that tilt cylinder 133 is angled differently than trim cylinder 137. Tilt cylinder 133 is positioned to swing drive-shaft housing 29, and therefore the lower 31, to a wide angle. Wide angle tilt, or tilting adjustment, usually involves a gross adjustment where the lower unit 31 is tilted to an extreme angle, usually for shallow water trolling, and to avoid contact of the lower unit 31 with debris, etc. Trim cylinder 137 provides narrow angled trimming adjustment. Trimming adjustment is a fine adjustment made usually during cruise to achieve optimal fine angle adjustment of the lower unit 31 to adjust the quality of ride or select the optimum angle of thrust of lower unit 31 for most efficient operation. The most efficient operation will dictate a fine, or trimming adjustment based upon the loading and distribution of the loading within a boat.

Adjacent transom 13 near the base of power tilt device 129 is provided a structural member 143 of clamp bracket 17 having a stopping pin 145 extending therethrough. The end of an arm 147, attached to driveshaft housing 29, rests against stopping pin 145 and provides a limit from which trim cylinder 137 begins to provide a range of movement of the drive shaft housing 29 with respect to engine 21 and clamp bracket 17.

The steering system provides a means to steer the boat to which outboard motor 10 is attached. Near the center of driveshaft housing 29, an upper steering bracket 149 and a lower steering bracket 151 are fixedly attached to driveshaft housing 29. Upper and lower steering brackets, 149 and 151, pivotally engage a steering shaft 153. Steering shaft 153 is journaled by a swivel bracket 155. Swivel bracket 155 is supported by clamp bracket 17.

The systems of the outboard motor 11 are enclosed as a single unit. The marine propulsion of the present invention is fitted with an engine cowling 157, an engine hood 159 and a moveable hood section 161. Moveable hood section 161 is situated to partially cover the top of the driveshaft housing 29. A generally frusto-conical shaped sleeve 163 is surroundingly connected at its smaller end to a portion of the exterior of water jacket 109. At its larger end it is connected at its upper surface to moveable hood section 161, and at its lower surface to a point over the drive shaft 49. In this manner, the area around the engine 21 is isolated, but the moveable hood section 161 is still allowed to freely tilt upwardly. Sleeve 163 also provides some protection to the end of water bellows 111.

FIG. 2 illustrates the lower unit 29 as it would appear in a position of rightward swivel. This indicates the relative range of movement in one direction necessary to enable the proper degree of steering of the boat onto which the outboard motor of the present invention would be affixed. FIG. 2 also shows the relative position of the exhaust system with regard to engine 21. FIG. 2 illustrates in phantom the structures associated with the tilting action shown in the embodiment of FIG. 1, including outer tilt bracket 23, inner tilt bracket 25, and pivot pins 27.

Figure 3:
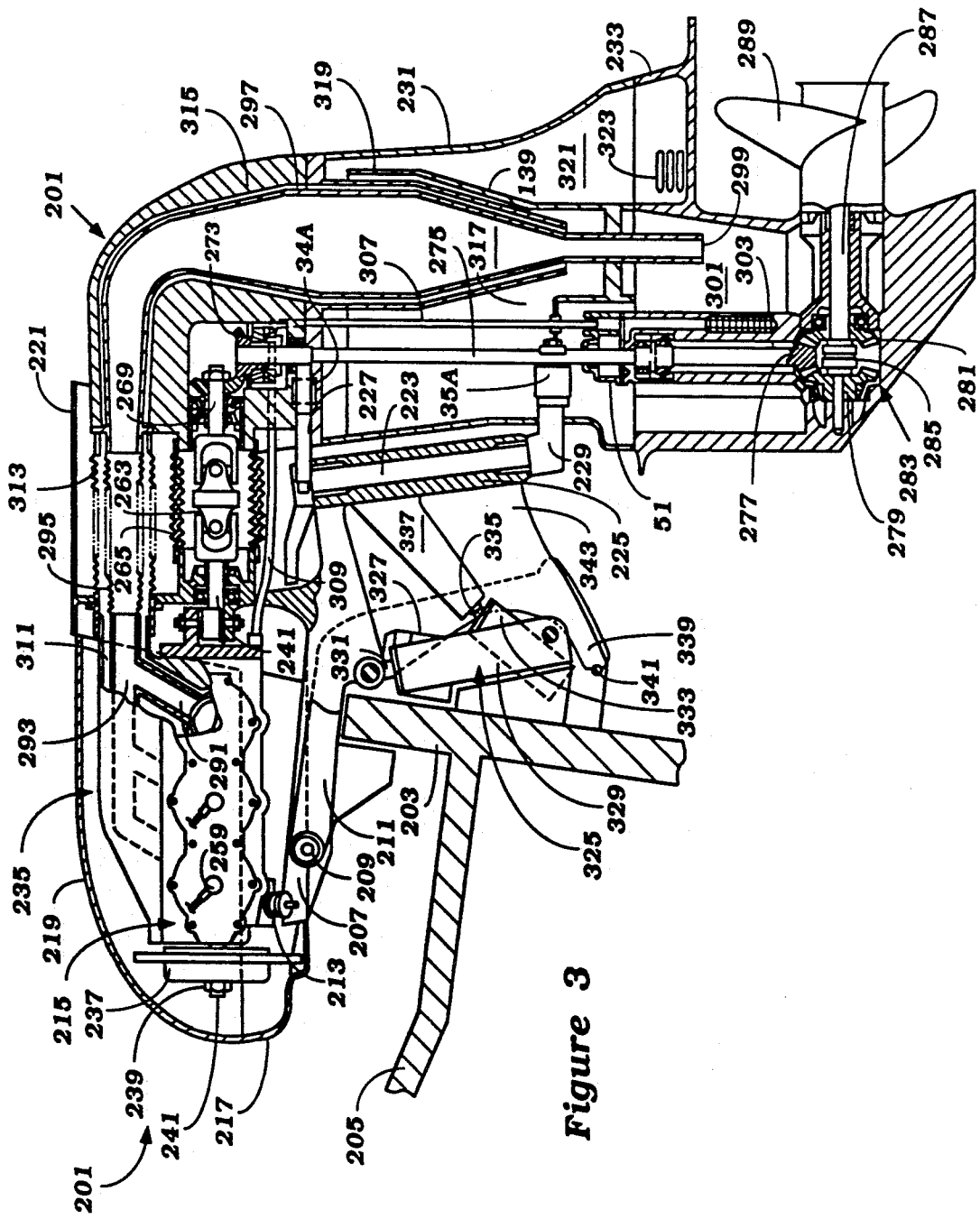
FIG. 3 is a side cross sectional view of a second embodiment of the outboard motor of the present invention in its normal running position.
Figure 4:
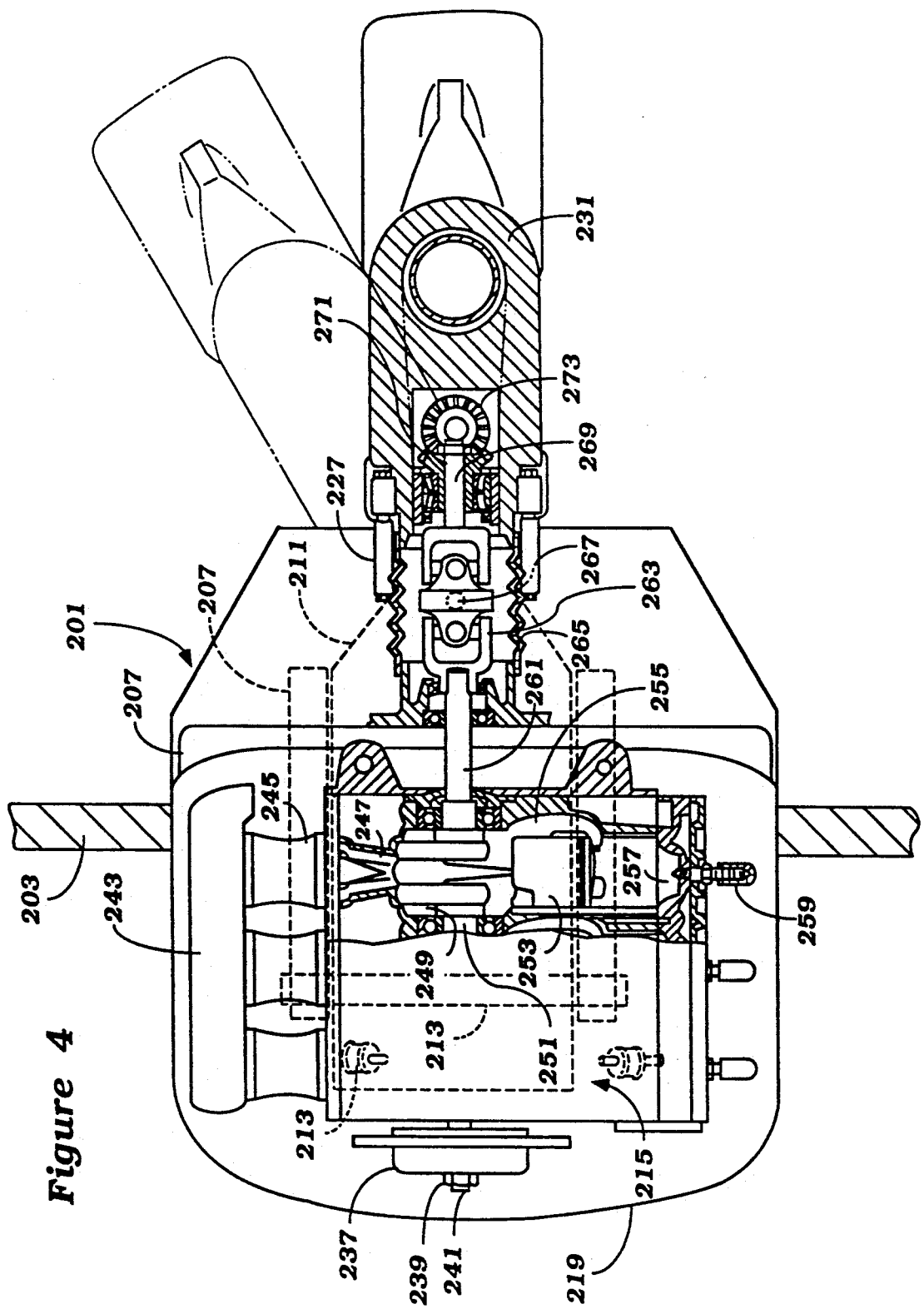
FIG. 4 is a top sectional view of the outboard motor illustrated in FIG. 3, emphasizing the exhaust transmission system; and, FIG. 5 is a side view of the marine propulsion unit of FIGS. 3 and 4 showing the unit tilted up.

Referring to FIG. 3, the internal details and configuration of a second embodiment of an outboard motor 201 of the present invention will be explained in great detail. Outboard motor 201 differs from outboard motor 11 mainly in that during tilting, the lower unit, driveshaft housing and engine all tilt simultaneously about a horizontal axis disposed forwardly of the transom. The systems of outboard motor 201 also cooperate in a synergistic manner to produce an outboard engine having an extended exhaust system having increased efficiency and silencing, and in addition a low profile, low aftwardly oriented center of gravity, and a reduced space requirement. In FIGS. 303, the outboard motor 201 of the present invention is illustrated in operating position, attached to the transom 203 of a boat. As in the first embodiment, the systems of the outboard motor 201 of the second embodiment cooperate to provide a superior outboard motor, include the structural support and steering system, the mechanical power transmission system, the cooling system, the exhaust system, and the tilt system. Each of these systems will be explored for familiarization.

With regard to structural support, outboard motor 201 is adapted to be attached to transom 203 of a boat (not shown). Forward of transom 203 is a motor well 205 which not only provides some support to transom 203, but is the space within which the outboard motor 201 of the present invention must limit its movement. Motor well 205 usually includes side boundaries, as are well known, but they are not illustrated in the figures. Secured to transom 203 is a clamp bracket 207, which is usually attached to transom 203 by clamps (not shown in the figures). At the forward end of clamp bracket 207, a pin 209 engages a structure which provides support for the engine and which is also known as a swivel bracket 211. Pin 209 is oriented to allow the pivoting engagement of clamp bracket 207 with swivel bracket 211 at a point significantly forward of transom 203. The swivel bracket 211 provides support through resilient engine mounts 213 to an engine 215. Swivel bracket 211 also supports an engine cowling 217, an engine hood 219, and the cover 221. As to the steering system, the swivel bracket 211 also lends structural support to a steering shaft 223 which it supports in a journal 225. The ends of steering shaft 223 are fixed to an upper steering bracket 227 and a lower steering bracket 229 that are fixed to a driveshaft housing 231. This arrangement allows driveshaft housing 231 and adjacent lower unit 233 to pivot for steering movement about the swivel bracket 211 and the clamp bracket 207.

In the power transmission system, the horizontally oriented engine 215 is depicted as a two-cycle three cylinder in this engine although, as in the first embodiment, other configurations are possible and occupies a space known as the power head 235, and as has been previously discussed, is supported by resilient supports 213. Engine 215 has a flywheel 237 held in place by a nut 239 on a crankshaft 241. A silencer 243 is connected to a set of three horizontally disposed side draft carburetors 245 which are in turn connected to and discharge into an intake manifold 247. Intake manifold 247 is in communication with a crankcase 249, as is typically in the case of a two cycle engine. The crankshaft 241 is suitably journaled within crankcase 249 and is driven by connecting rods 251, which are in turn connected to pistons 253. Pistons 253 cooperate into one or more scavenging ports 255 for each cylinder, which enables engine 215 to receive a combustible mixture from the crankcase into a combustion chamber 257, as is well known for two cycle engines. Spark plugs 259 provide ignition of the combustible mixture in a well known manner.

During combustion, mechanical power is transmitted from the crankshaft 241 to a horizontally oriented output shaft 261. Note that the entire engine assembly, including pistons 253, crankshaft 241, and output shaft 261 are horizontally oriented. This horizontal orientation enables engine 215 to be brought almost entirely forward of transom 203 and enables the low profile of outboard motor 201 as is readily seen from FIGS. 3 and 5. Output shaft 261 is connected to a generally horizontally oriented universal joint 263. Universal joint 263 is surrounded by a power transmission bellows 265 to provide flexible covering. An area 267 of universal joint 263, as well as steering shaft 223, lies on the steering axis common to the swivel bracket 211 and driveshaft housing 231. Universal joint 263 is connected to an input driveshaft 269. At the end of input driveshaft 269 is a bevel gear 271, rotatable about a horizontal axis which engages a bevel gear 273 rotatable about a vertical axis.

Bevel gear 273 is connected to one end of a driveshaft 275 which extends through and is suitably journaled in driveshaft housing 231. Driveshaft 275 extends into the lower unit 233 where it is connected to a gear 277. Gear 277 engages counter-rotating gears 279 or 281 within a gear box 283. A clutch 285 is splined to a propeller shaft 287 and couples that shaft to either the gear 279 or 281 for selected forward or reverse drive. A propeller 289 is suitably fixed to propeller shaft 287 and is of a suitable type to make driving engagement with the water, such type dependent upon the load and running conditions of boat 275 (not shown) to which the outboard motor 201 is attached. Note the relative aft displacement of the driveshaft 275 and the driveshaft housing 231, which causes a more aftwardly center of gravity.

The configuration of the second embodiment of the present invention also facilitates the utilization of an extended exhaust and cooling water passage which improves silencing. The outboard motor 201 of the present invention also has a much longer exhaust passage to facilitate the tunable adjustment of its dimension to match the frequency and throughput of the exhaust gases from engine 215, as was the case in the first embodiment.

The extended exhaust system of the outboard motor 201 of the present invention is best illustrated with reference to FIG. 3. In communication with each combustion chamber 257 of engine 215 are upwardly extending exhaust ports 291 that are forward of the transom 203. The exhaust manifold 293 opens into an exhaust bellows 295. Exhaust bellows 215, like that of the first embodiment, has a series of corrugations along its main body portion and is made of flexible material. In the second embodiment, exhaust bellows 215 must have the ability to flexibly cycle many times because each time the driveshaft housing 231 and lower unit 233 is steered, the exhaust bellows 215 will be flexed. Center positioning of exhaust bellows provides even flexing for extended service life.

Exhaust bellows 215 is in communication with an exhaust muffler 297, having a horizontally extending inlet an d a vertically extending body and outlet, the outlet labeled as number 299. The central part of muffler 297 forms an expansion chamber, as was the case in the first embodiment. Thus we see that, as in the case of the first embodiment, noise is abated both through the right angle turn between the inlet connection with exhaust bellows 295 and with respect to the expanded body portion forming the expansion chamber. Outlet 299 opens into an exhaust chamber 301 which is in communication through a path not shown with the center portion of propeller 289. In this manner, the exhaust gases are expelled through propeller 289, typically beneath the water line in order to improve silencing. The extended distance between exhaust port 291 and the point where the exhaust gases are expelled through propeller 289 is made possible by bringing the engine 215 forward of the transom 203 while extending the driveshaft housing 231 and lower unit 233 farther aft of the transom 203.

To provide insulatory cooling water for the engine 215 and the exhaust system of the outboard motor 201 of the present invention and to improve the silencing characteristics of the outboard motor 201 of the present invention, a water jacketing system is provided. A water inlet 303 provides water to a water pump 305. Water pump 305 pumps water through a conduit 307 and through a connected water hose 309. Water hose 309 is in communication with engine 215 through a path not shown, where it supplies water to cool the portions of engine 215 subject to heating. The cooling water exits engine 215 through a water jacket passage 311 which surrounds exhaust manifold 293. Water jacket passage 311 is connected to a water passage 315 surrounding muffler 297. Water passage 315 is in communication with a water chamber 317. Water chamber 317 comprises a transition passage 319 surrounding the passage 311 and communicates with an exit chamber 321. Exit chamber 321 contains a plurality of exit openings 323 through which the spent cooling water is expelled, thus completing its path through the cooling system.

The tilt and trim system is adjacent transom 203. A power tilt device is generally designated as 325. Power tilt device 325 has an electric motor 327 driving an oil pump (not shown) included in the power tilt device 325. Electric motor 327 is situated atop power tilt device 325. Adjacent electric motor 327 and connected to clamp bracket 207 at a point near the housing of power tilt device 325 is a tilt cylinder 329, having a tilt cylinder rod 331 pivotally attached to the upper inside portion of the swivel bracket 211. Laterally adjacent the lower portion of tilt cylinder 329 is a trim cylinder 333 attached to power tilt device 325. Trim cylinder 333 has a trim cylinder rod 335 which makes contact with an arm 337 which is also attached to a portion of swivel bracket 211.

Note that tilt cylinder 329 is angled differently than trim cylinder 333. The tilt cylinder 329 is positioned to swing driveshaft housing 231, lower unit 233 and clamp bracket 207 to a wide angle to an out-of-the-water storage position. Trim cylinder 333 provides narrow angled trimming adjustment. Trimming adjustment is a fine adjustment made usually during cruise to achieve optimal fine angle adjustment of the lower unit 233 to adjust the quality of ride or select optimum angle of thrust of lower unit 233 for the most efficient operation. The most efficient operation will dictate a fine, or trimming adjustment based upon the loading and distribution of the loading within a boat.

Adjacent transom 203 near the base of power tilt device 325 is provided a structural member 339 of clamp bracket 207 having a stopping pin 341. An arm 343 attached to swivel bracket 211 rests against stopping pin 341 and provides a limit from which both trim cylinder 333 and tilt cylinder 329 begin to provide a range of movement of the swivel bracket 211 and the driveshaft housing 231 and lower unit 233 and engine 215, with respect to clamp bracket 207. Tilt cylinder 329 also provides a shock absorbing function. When the boat is in forward motion, the tilt cylinder 329 acts as a shock absorber with respect to objects encountered by lower unit 233. In reverse, tilt cylinder 329 provides resistance to the rearward thrust of the lower unit 233.

The manner of trimming and tilting of outboard motor 210 has certain advantages best illustrated with respect to FIG. 5. FIG. 5 illustrates the outboard motor 201 in the tilted up out-of-the-water position. In this position it can be seen that relative to transom 203, that motor well 205, and clamp bracket 207, that swivel bracket 211, engine 215, engine cowling 217, driveshaft housing 231 and lower unit 233 have changed position. Very little volume is displaced by engine cowling 217 and hood 219 as it tilts toward the motor well 205. A portion of the tilt cylinder rod 331 is visible in extended position just above the top of clamp bracket 207. Arm 343 is swung away from engagement with stopper pin 341 (not visible in FIG. 5) which is previously shown in FIG. 3. The steerable pivoting from side to side in the plane normal to length of steering shaft 223 is still permissible during full tilt.

The foregoing disclosure and description of the invention are illustrative and explanatory thereof and various changes in the configuration of the disclosed outboard motor, relative amounts of space saved, relative degree to which an extended center of gravity is maintained, the relative portions of the outboard motor which are allowed to pivot, the extent to which the systems of an outboard motor are trimmingly tilted to achieve desired trim, the materials of construction, and location of the apex of the angle of pivot or tilt, along with any changes of the illustrated construction, may be made without departing from the spirit or scope of the invention.

What is claimed:

1. An outboard motor for attachment as a unit to the transom of a watercraft comprising: means for affixing said outboard motor unit to said transom; an engine having a horizontally disposed engine output shaft disposed in substantial part forwardly of said transom; a driveshaft housing disposed rearwardly of said transom and journaling a driveshaft for rotation about a generally vertically extending axis and driven by said engine output shaft; propulsion means at the lower end of said driveshaft housing and driven by said driveshaft for propelling the watercraft; and, exhaust means, extending from said engine above said output shaft rearwardly over said transom to a position adjacent said propulsion means, for expanding and then contracting exhaust gases before discharging said exhaust gases to the atmosphere.

2. An outboard motor as recited in claim 1, wherein said exhaust means further comprises a water jacket, surrounding said exhaust means in the area above said output shaft.

3. An outboard motor as recited in claim 1 further comprising a high speed exhaust gas discharge at said propulsion means, and wherein said exhaust means further comprises: a horizontal portion connected to said engine and extending forwardly of said engine; a vertical portion extending downwardly from and connected to said horizontal portion; and, means for delivering exhaust gases from said vertical portion to said high speed exhaust gas discharge.

4. An outboard motor as recited in claim 3, wherein said horizontal portion further comprises a flexible bellows above said engine output shaft.

5. An outboard motor as recited in claim 4, wherein said driveshaft housing pivots with respect to said means for affixing about a vertical pivot axis which extends through said flexible bellows.

6. An outboard motor as recited in claim 4, wherein said vertical portion further comprises a muffler having an enlarged cross sectional area.

7. An outboard motor as recited in claim 6, further comprising a water jacket about said horizontal portion, said vertical portion, and said muffler, including an annular cone surrounding said muffler along a portion of its length.

8. An outboard motor as recited in claim 7, wherein said annular cone is surrounded by a water chamber having a water level during operation of said outboard motor defined by a vertically extending retaining wall.

9. An outboard motor as recited in claim 1, wherein said engine is encased in a cowling supporting a hood, and further comprising: a movable hood section, movable with respect to said hood; and a sleeve surroundingly connected to a portion of the exterior of said water jacket and connected to moveable hood section, to assist in enclosing said engine.

10. An outboard motor as recited in claim 4, wherein said vertical portion further comprises: a muffler having an increasing cross sectional area and a decreasing cross sectional area along its length.

11. An outboard motor as recited in claim 10, wherein said increasing cross sectional area and said decreasing cross sectional area have a conical shape.

12. An outboard motor as recited in claim 5 wherein said high speed exhaust gas discharge is angularly pivotable with respect to said engine about a vertical pivot axis which extends through said flexible portion of said horizontal portion.

13. The exhaust system as set forth in claim 3 wherein said vertical portion has an expanded cross sectional area along a portion of its length.

14. An outboard motor as recited in claim 4 further including means defining a cooling jacket around the flexible bellows adapted to receive coolant from the engine for cooling the exhaust gases.

15. An outboard motor as recited in claim 14 wherein the cooling jacket is formed in part by a further flexible bellows.

* * * * *